US008185449B2

(12) United States Patent
Ward (10) Patent No.: US 8,185,449 B2
(45) Date of Patent: May 22, 2012

(54) SYSTEM AND METHOD OF PROVIDING FUEL

(75) Inventor: Matthew Ward, Edinburgh (GB)

(73) Assignee: The Royal Bank of Scotland plc (GB)

( * ) Notice: Subject to any disclaimer, the term of this patent is extended or adjusted under 35 U.S.C. 154(b) by 132 days.

(21) Appl. No.: 12/626,436

(22) Filed: Nov. 25, 2009

(65) Prior Publication Data

US 2011/0125600 A1 May 26, 2011

(51) Int. Cl.
*G06Q 30/00* (2012.01)
(52) U.S. Cl. .................. 705/26.2; 705/26.25; 705/26.81
(58) Field of Classification Search ............... 705/26, 705/27
See application file for complete search history.

(56) References Cited

U.S. PATENT DOCUMENTS

| 6,965,872 | B1 | 11/2005 | Grdina | |
|---|---|---|---|---|
| 2003/0110140 | A1 | 6/2003 | Morrison, III et al. | |
| 2006/0218056 | A1 | 9/2006 | Dickman | |
| 2008/0015964 | A1 | 1/2008 | Shuster | |
| 2008/0195486 | A1* | 8/2008 | Sopinsky et al. | 705/14 |
| 2008/0249917 | A1* | 10/2008 | Kirch et al. | 705/37 |
| 2008/0262892 | A1* | 10/2008 | Prager et al. | 705/8 |
| 2008/0313070 | A1 | 12/2008 | Fell et al. | |
| 2009/0070254 | A1* | 3/2009 | Thrush | 705/39 |

OTHER PUBLICATIONS

"Locked in Fuel costs were a deal, but with prices at the pump dropping, city is tied to higher prices" (Wisconsin State Journal. Madison, Wis.: Nov. 25, 2008 p. A.1) retrieved from Proquest on Feb. 16, 2012.*
"Gas Bank USA, Llc; Fixed Price Gasoline Web Site Set to Launch at www.gasbankusa.com" (Energy Business Journal. Atlanta: Jul. 14, 2008. p. 107) retrieved from Proquest on Feb. 16, 2012.*

* cited by examiner

*Primary Examiner* — Jeffrey A Smith
*Assistant Examiner* — Courtney Stopp
(74) *Attorney, Agent, or Firm* — DLA Piper LLP (US)

(57) ABSTRACT

Disclosed is a computer implemented method comprising the steps of calculating a fuel entitlement price, which is valid for a first order time period; receiving within the first order time period an order signal representing a first order by a customer for a fuel entitlement volume at the entitlement price, and accepting the first order, wherein the entitlement volume entitles the customer to take delivery from one or more of a plurality of filling stations, within a first entitlement time period, of a volume of fuel, in the aggregate, up to the entitlement volume, the first entitlement time period extending beyond the first order time period; updating a fuel entitlement balance of the customer to reflect the first order and the first entitlement time period; and updating the fuel entitlement balance of the customer in response to receipt of data indicating that the customer has taken delivery of a volume of fuel from a filling station.

14 Claims, 8 Drawing Sheets

SYSTEM AND METHOD OF PROVIDING FUEL

FIELD OF THE INVENTION

The present invention relates to a method of providing fuel, and more particularly, but not exclusively, to providing fuel at a plurality of filling stations.

BACKGROUND OF THE INVENTION

Fuel costs typically represent a large percentage of total expenditure for a business. Often, a business will require a significant volume of fuel to provide transportation of goods or services to and from customers or suppliers. Such transportation is an essential requirement for many businesses and fluctuating fuel costs present a risk to cashflow and profitability. Thus, the ability to accurately budget for the future fuel cost is of great importance.

Typically, the retail fuel price payable at a filling station is related to the underlying spot price of the fuel. The spot price can exhibit significant fluctuations due, for example, to changing reserve levels, production/extraction costs, level of demand, political and geopolitical factors, transportation costs, and taxation. Fluctuations in the fuel spot price are generally reflected in the retail fuel price paid by the customer at a filling station.

Fluctuating fuel retail prices pose difficulties for businesses, and in particular small to medium size businesses, where cash flow may be restricted or profitability may be adversely affected. It is therefore in the interest of a business to negate the effect of fuel price fluctuations as far as is practical.

In order to negate the effect of spot price fluctuations, fuel is often purchased and traded via future or forward contracts, whereby the contract price is set at the time the contract is purchased but delivery or payment is due at a time in the future. Whilst, future and forward contracts provide a means to fix the price of fuel in the future, therefore simplifying budgeting, the volume of fuel traded by a single contract is typically far greater than the volume of fuel required by a small to medium sized business. Therefore, small to medium sized businesses may be excluded from being able to take advantage of such facilities. It has been proposed, therefore, that small to medium sized businesses may be able to access such facilities if their fuel needs are aggregated; however, complex, expensive and potentially risky future and forward contracts are not always a preferred option.

An alternative approach to negating the effect of fluctuating fuel prices is to stockpile fuel in a bunker for use over an extended period. Generally, in such an approach, a large volume of fuel is purchased and stored in a tank and used to refuel vehicles when necessary. Whilst such an approach guarantees a fixed price for the volume of fuel purchased, additional storage and transportation costs are incurred, in addition to the dangers associated with storing a large volume of flammable fuel. Moreover, vehicles can only refill at the bunker location, thus losing the flexibility provided by a network of filling stations.

A further alternative solution adopted by many small to medium sized businesses is to use fuel cards offering discounted fuel at a network of filling stations. In this situation, the filling station would receive an agreed commission from the retail price, with the remainder going to a bunkering network which stores and supplies the fuel via a network of bunkers located at the filling stations. When a customer purchases or receives fuel (hereinafter termed a 'fuel transaction') from a filling station using an appropriate fuel card, the filling station notifies the bunkering network that the fuel transaction has taken place and the bunkering network updates account information relating to the customer on the basis of the fuel transaction. The account information may, for example, include data relating to historical fuel purchases, or a credit balance associated with the customer. Whilst these cards offer a saving over conventional purchasing of fuel, the user remains exposed to fluctuations in the retail fuel prices at the filling stations.

SUMMARY OF THE INVENTION

In accordance with a first aspect of the present invention, there is provided a computer implemented method comprising the steps of: calculating a fuel entitlement price, which is valid for a first order time period; receiving within the first order time period an order signal representing a first order by a customer for a fuel entitlement volume at the entitlement price, and accepting the first order, wherein the entitlement volume entitles the customer to take delivery from one or more of a plurality of filling stations, within a first entitlement time period, of a volume of fuel, in the aggregate, up to the entitlement volume, the first entitlement time period extending beyond the first order time period; updating a fuel entitlement balance of the customer to reflect the first order and the first entitlement time period; and updating the fuel entitlement balance of the customer in response to receipt of data indicating that the customer has taken delivery of a volume of fuel from a filling station.

In some embodiments, the method further comprises receiving a filling station request signal associated with the customer taking delivery of a volume of fuel from the filling station, and authorising the request if the volume of fuel does not exceed the associated customer fuel entitlement balance and the delivery falls within the associated entitlement time period.

In some embodiments, the method of further comprises, before the end of the first entitlement time period, calculating a second fuel entitlement price, which is valid for a second order time period; receiving within the second order time period a second order signal representing an order by the customer for a second fuel entitlement volume at the second entitlement price, and accepting the order, wherein the second entitlement entitles the customer to take delivery from one or more of the plurality of filling stations, within a second entitlement time period, of a second volume of fuel, in the aggregate, up to the second entitlement volume, the second entitlement time period extending beyond the first entitlement time period and the second order time period.

In some embodiments, the method further comprises updating the customer fuel entitlement balance to reflect an aggregation of the first and second orders over the first and second entitlement time periods and any fuel already delivered to the customer under the first order.

In some embodiments, the method of claim comprises receiving within the first order time period plural order signals representing orders by plural customers for respective fuel entitlement volumes and calculating an aggregated fuel entitlement volume; and purchasing sufficient fuel to satisfy the aggregated fuel entitlement volume.

In some embodiments, the method of comprises calculating a fuel distribution of the purchased fuel among the plurality of filling stations, based on data representing amounts of fuel delivered by each of the filling stations to the plural customers; and distributing the purchased fuel among the plurality of filling stations according to the calculated fuel distribution.

In some embodiments, the method further comprises receiving a wholesale signal representing a wholesale fuel price and calculating the fuel entitlement fuel price based on the wholesale fuel price.

In some embodiments, the method further comprises sending a signal representing a wholesale order for a wholesale volume of fuel at the wholesale fuel price, the wholesale volume being sufficient to fulfil the first order.

In some embodiments, the method further comprises receiving within the first order time period plural order signals representing orders by plural customers for respective fuel entitlement volumes and calculating an aggregated fuel entitlement volume; and sending a signal representing a wholesale order of a wholesale volume of fuel at the wholesale price, the wholesale volume being sufficient to fulfil the aggregated fuel entitlement volume.

In some embodiments, the entitlement fuel price is calculated based on the wholesale fuel price and a cost associated with distribution and storage of fuel to the plurality of filling stations.

In some embodiments, the method further comprises sending a notification of the remaining customer fuel entitlement balance to the customer if the fuel entitlement balance drops below a notification volume.

In some embodiments, if at the end of the first entitlement period some or all of the entitlement balance remains, further calculating a carry-over volume based on the remaining entitlement balance, and aggregating the carry-over volume with the entitlement balance associated with a subsequent entitlement period.

In some embodiments the fuel is diesel; in others it is petrol, or gas.

In accordance with a second aspect of the present invention, there is provided a fuel transaction server configured to perform the steps of: calculating a fuel entitlement price, which is valid for a first order time period; receiving within the first order time period an order signal representing a first order by a customer for a fuel entitlement volume at the entitlement price, and accepting the first order, wherein the entitlement volume entitles the customer to take delivery from one or more of a plurality of filling stations, within a first entitlement time period, of a volume of fuel, in the aggregate, up to the entitlement volume, the first entitlement time period extending beyond the first order time period; updating a fuel entitlement balance of the customer to reflect the first order and the first entitlement time period; and updating the fuel entitlement balance of the customer in response to receipt of data indicating that the customer has taken delivery of a volume of fuel from a filling station.

In accordance with a third aspect of the present invention, there is provided a computer implemented method comprising the steps of: calculating a fuel entitlement price based on a wholesale fuel price, the entitlement price being valid for an order time period; receiving customer order data representing a entitlement volume at the entitlement price, wherein the entitlement volume entitles the customer to receive in aggregate up to an equivalent volume of fuel at one or more of a plurality of filling stations over an entitlement time period, the entitlement time period being longer than the order time period; updating balance data based on the customer order data, the balance data representing a total fuel entitlement volume during the entitlement time period; and, updating the balance data based on transaction data, the transaction data representing a volume of fuel received by the user at one or more of the plurality of filling stations during the entitlement time period.

BRIEF DESCRIPTION OF THE DRAWINGS

Further features and advantages of the invention will become apparent from the following description of preferred embodiments of the invention, given by way of example only, which is made with reference to the accompanying drawings, in which.

In the drawings identical components represented in more than one figure are denoted with the same reference numeral or symbol.

DETAILED DESCRIPTION OF THE INVENTION

Figure 1:
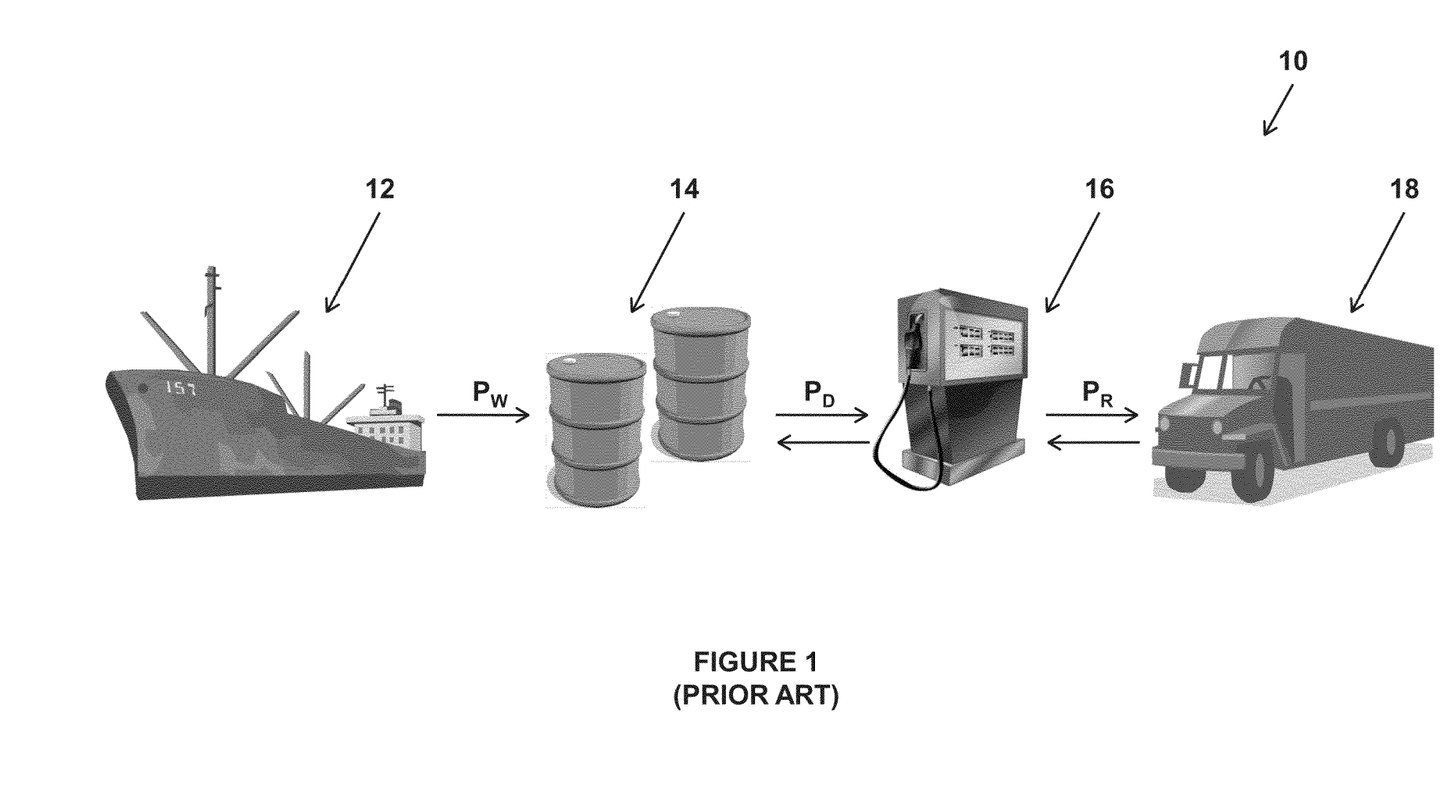
FIG. 1 is a diagram illustrating a prior art fuel supply network.

FIG. 1 represents a prior art fuel supply network 10, comprising a wholesaler 12, a bunkering network 14, a filling station network 16 comprising a plurality of filling stations, and a customer 18. The wholesaler 12 supplies fuel in large volumes at a wholesale fuel price, which may typically be based on the fuel spot price, forward contract, future contracts, or a suitable combination thereof. Typically, the wholesale price offered by the wholesaler 12 will fluctuate on an hourly or daily basis. Generally, the fuel wholesaler 12 provides fuel only to large commercial customers, industrial customers or bunkering networks (such as bunkering network 14), and, as such, is inaccessible to small to medium sized businesses. Instead, a customer, such as customer 18, must purchase fuel from a network of filling stations 16 at a retail price which is normally higher than the wholesale price. In turn, the filling station network 16 supplies the customer 18 with fuel stored and managed by the bunkering network 14. In turn, the bunkering network 14 is supplied with fuel by the wholesaler 12. In some instances, a combination of the bunkering network 14, the filling station network 16 and the wholesaler 12 (or any sub-combination thereof) may be operated by a single company, group or legal entity. For example, the wholesaler 12 and the bunkering network 14 may be owned and operated by a single entity.

Typically, the bunkering network 14 will rent, lease, own or otherwise have access to bunker capacity at each of the filling stations in the filling station network 16. The bunker capacity at each of the filling stations is used to store a volume of fuel provided to the bunkering network 14 by the wholesaler 12 for supply to customer 18.

Periodically, the bunkering network 14 arranges refueling or restocking of the bunkers at the filling stations where necessary in order to ensure that a sufficient volume of fuel is available for subsequent customers. Restocking may be performed simply in response to demand, or alternatively, predictive methods may be used in order to predict demand on the basis of historical data, thus facilitating efficient distribution of fuel to a plurality of filling stations.

Typically, bunkering network 14 purchases fuel from the wholesaler 12 at the wholesale fuel price, $P_W$, where the wholesale fuel price $P_W$ fluctuates with time. The bunkering network 14 then adds a mark-up $M_B$ to the wholesale fuel price, the mark-up $M_B$ being sufficient to cover the cost of storing and managing the bunkered fuel, and provide a profit for the bunkering network 14. Thus, the bunkering network 14 supplies fuel to the filling station network 16 at a cost of $P_D=P_W+M_B$. The filling station network 16 then adds a margin, $M_F$, to cover running costs and provide a reasonable profit. In some instances, the filling station margin, $M_F$, may be determined on a geographical basis to account for higher distribution costs, or may even be calculated on an individual filling station basis. The retail fuel price paid by the customer 18 is therefore $P_R=P_W+M_B+M_F$ (ignoring government imposed taxes). Thus, it can be seen that the retail price paid by the customer, $P_R$, is sensitive to variations in the underlying wholesale price, $P_W$, and any variations in the various mark-ups. Such variations are difficult to predict which in turn causes difficulties for the customer 18 wishing to budget for fuel expenditure.

Figure 2:
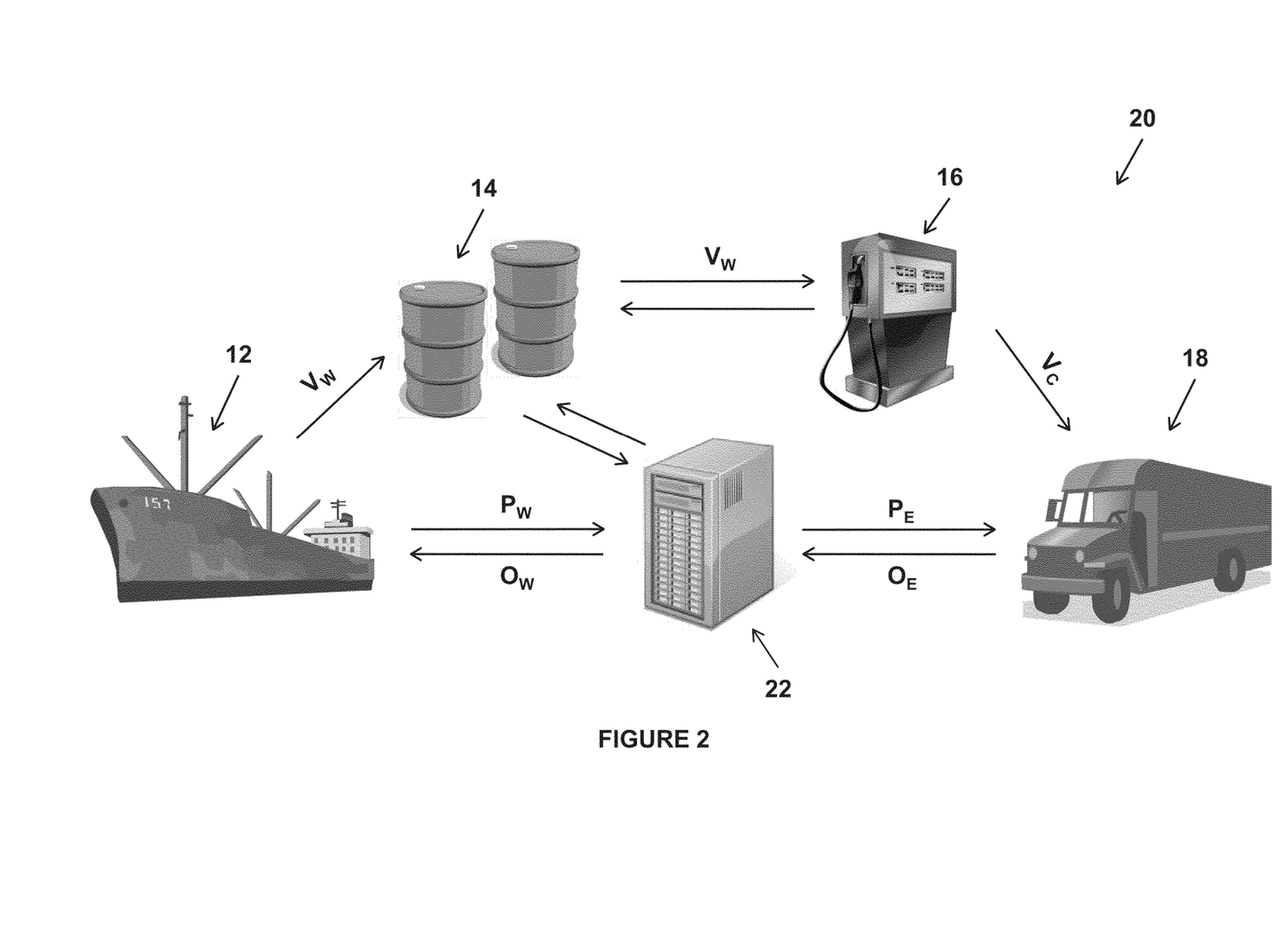
FIG. 2 is a diagram illustrating a fuel supply network in accordance with an embodiment of the present invention.

FIG. 2 represents a fuel supply network 20 in accordance with an embodiment of the present invention. In addition to the wholesaler 12, bunkering network 14, filling station network 16 and customer 18, the network further comprises a fuel transaction service 22. The fuel transaction service 22 is arranged to calculate an entitlement price, $P_E$, valid for an order time period, $T_O$. During the order time period, $T_O$, the customer 18 may purchase an entitlement volume, $V_E$, at the entitlement price, $P_E$. The customer 18 is then eligible to receive a volume of fuel in the aggregate up to a volume equivalent to the entitlement volume $V_E$ at one or more filling stations in the filling station network 16 during an entitlement period $T_E$, where $T_E$ is typically longer than $T_O$ (for example, the entitlement time period, $T_E$, may be three months, whereas the order time period, $T_O$, may be one day or one week). Thus, the fuel transaction service 22 provides a facility whereby the customer 18 can, in effect, fix the cost of a desired volume of fuel for the entitlement time period, $T_E$, whilst still benefiting from the convenience of receiving the fuel from any of the filling stations in the filling station network 16. In some embodiments, the customer 18 may purchase the entitlement volume, $V_E$, using a credit facility offered by the fuel transaction service 22 or an alternative credit provider.

The customer 18 places an order, $O_E$, with the fuel transaction service 22 and provides payment for an entitlement volume of fuel, $V_E$, at the entitlement price $P_E$. The fuel transaction service 22 then calculates a wholesale volume of fuel, $V_W$, sufficient to fulfil the customer order, $O_E$. The transaction service 22 then places a wholesale order, $O_W$, with the wholesaler 12 for the wholesale volume of fuel, $V_W$, at the wholesale price $P_W$. The volume of fuel purchased, $V_W$, is then delivered to the bunkering network 14 and is in turn distributed to customers via the filling station network 16. In some embodiments, the fuel transaction service 22 will receive customer orders from a plurality of customers which are batched together to calculate a total wholesale volume, $V_W$. In this case, the wholesale order, $O_W$, placed with the wholesaler is sufficient to fulfil the orders from the plurality of customers. The ordered wholesale volume of fuel, $V_W$, is delivered to the one or more bunkers in the bunker network 14 such that it is available to the customers via the filling stations. In some embodiments, the wholesale volume will be delivered equally to each bunker in the bunker network 14, whereas in an alternative embodiment the volume delivered to a particular bunker by the wholesaler 12 may be determined by the bunker network 14 based, for example, on predicted or historic demand for fuel at the respective filling station.

It is envisaged that in some embodiments the wholesale volume, $V_W$, may be calculated using alternative methods based on, for example, the existing volume of wholesale fuel in the system or the total outstanding entitlement volume for the customers. It will be appreciated that such alternative calculation methods may be implemented within the current framework without departing from the scope of spirit of the present invention.

The customer is associated with an account identifier or token which is associated with account data stored by the fuel transaction service 22. The account data comprises data representing an entitlement volume balance available to the customer 18 during entitlement time period $T_E$. Upon purchase of an entitlement volume, $V_E$, by the customer 18, the associated account data is updated to reflect the change in entitlement volume balance. The customer 18 is further provided with one or more fuel cards or tokens which comprise(s) the account identifier and enable(s) the customer 18 to make a fuel transaction for a fuel volume $V_C$ up to a volume equivalent to the purchased entitlement volume $V_E$ from any filling station in the filling station network 16 at any time during the entitlement time period $T_E$. When the customer takes delivery of a volume of fuel, $V_C$, at a filling station, information regarding the delivery is sent to the bunkering network 14 which in turn informs the fuel transaction service 22. The fuel transaction service 22 then updates the account information to reflect the new entitlement volume balance associated with the customer 18.

In some embodiments, the fuel transaction may be authorised by the fuel transaction service 22 prior to providing customer 18 with the fuel volume $V_C$. Authorisation may include checking the remaining customer's entitlement balance to ensure that the customer 18 has sufficient entitlement volume remaining to receive fuel volume $V_C$ in the relevant entitlement period (although, if there is insufficient entitlement, fuel may still be received by paying the retail price as usual). Following successful authorisation of the fuel transaction, the customer 18 is able to receive fuel volume $V_C$ without further payment. In alternative embodiments, authorisation of a fuel transaction may be performed by the bunkering service by reference to the customer's remaining entitlement balance.

Each of the one or more fuel cards or tokens associated with the customer 18 may be associated with a specific vehicle or employee. In this way, it is possible to keep a record of vehicle and/or employee mileage and/or fuel usage. The fuel card is typically a smart card or chip card, and may be combined with known security and fraud prevention measures such as those defined by the EMV standard (Europay™, MasterCard™, VISA™).

The fuel transaction 22 service calculates the entitlement price $P_E$ based on the wholesale price $P_W$ provided by the wholesaler 12 and a mark-up cost. Typically, the mark-up cost is based on a combination of a distribution and bunkering cost, $M_B$, a filling station cost, $M_F$, and a provider cost, $M_P$. The distribution and bunkering cost, $M_B$, represents the cost of storing and distributing the fuel via the bunkering network 14 and typically includes a reasonable mark-up. The filling station cost covers the running costs of the filling station network 16 and typically includes a reasonable mark-up. Finally, the provider cost, $M_P$, covers the running costs associated with the fuel transaction service 22 and may typically include a mark-up.

Typically, the volume of fuel equivalent to the entitlement volume, $V_E$, purchased by the customer will represent a small fraction of the total fuel in storage by bunkering network 14 at any particular time. Thus, the customer 18 benefits from the economies of scale provided for by use of the bunkering network 14. Moreover, the customer 18 benefits from the convenience of being able to receive a volume of fuel equivalent to the entitlement volume at any of the filling stations in filling station network 16 without additional cost beyond the cost of the original order, $O_E$. Where a large number of customers purchase fuel entitlement via the system illustrated in FIG. 2, the aggregate volume of fuel present in the bunkering network 14 is sufficient to provide for variations in demand (and/or demand location) from the customers, thus negating or rendering negligible geographical or transient effects.

Figure 3:
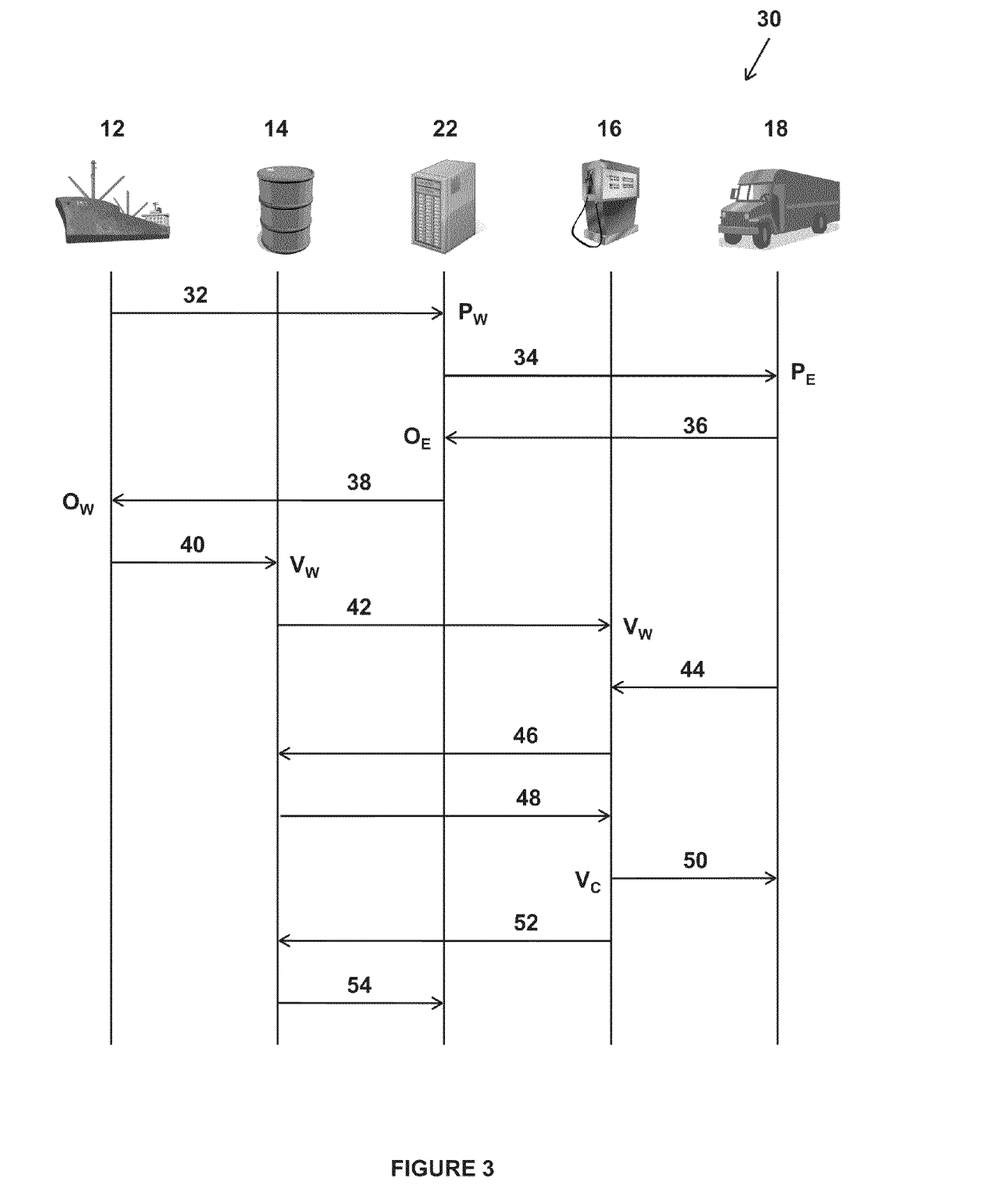
FIG. 3 is a process flow diagram illustrating a method of providing fuel in accordance with an embodiment of the present invention.

FIG. 3 illustrates a method 30 of providing fuel in accordance with an embodiment of the invention, and for use in conjunction with the network shown in FIG. 2. First, the wholesale service 12 communicates the wholesale price, $P_W$, to the fuel transaction service 22 [step 32]. Next, the fuel transaction service 22 calculates the entitlement price, $P_E$, and communicates this to the customer 18 [step 34]. The customer 18 then places an order, $O_E$, for an entitlement volume of fuel, $V_E$ [step 36]. The fuel transaction service 22 receives the order, $O_E$, and places a wholesale order, $O_W$, for a wholesale volume of fuel, $V_W$, with the wholesaler at the wholesale price, $P_W$ [step 38]. The wholesale volume of fuel $V_W$ is then delivered to the bunkering network [step 40] and stored in bunkers for delivery via filling station network 16 [step 42]. At a time subsequent to making order $O_E$, the customer 18 then provides a fuel card at a filling station and requests a transaction volume of fuel $V_C$ [step 44]. The filling station sends details of the requested fuel transaction to the bunkering network 14 [step 46]. The bunkering network 14 verifies that the customer 18 has sufficient entitlement balance and authorises the transaction [step 48]. The customer 18 is then provided with the requested fuel [step 50] and the filling station or filling station network then informs the bunkering network 14 that the volume of fuel $V_C$ has been provided to the customer 18 [step 52] and the bunkering network 14 in turn informs the fuel transaction service 22 [step 54]. Finally, the fuel transaction service 22 updates the account information associated with the customer 18 to reflect the fuel transaction volume received, V.

It will be apparent that steps 44 & 46 of FIG. 3 relating to authorisation of a fuel transaction by the bunkering network 14, may alternatively or additionally be performed by the fuel transaction service 22. In either case, the fuel transaction volume, $V_C$, will be authenticated against the customer's entitlement balance.

Figure 4:
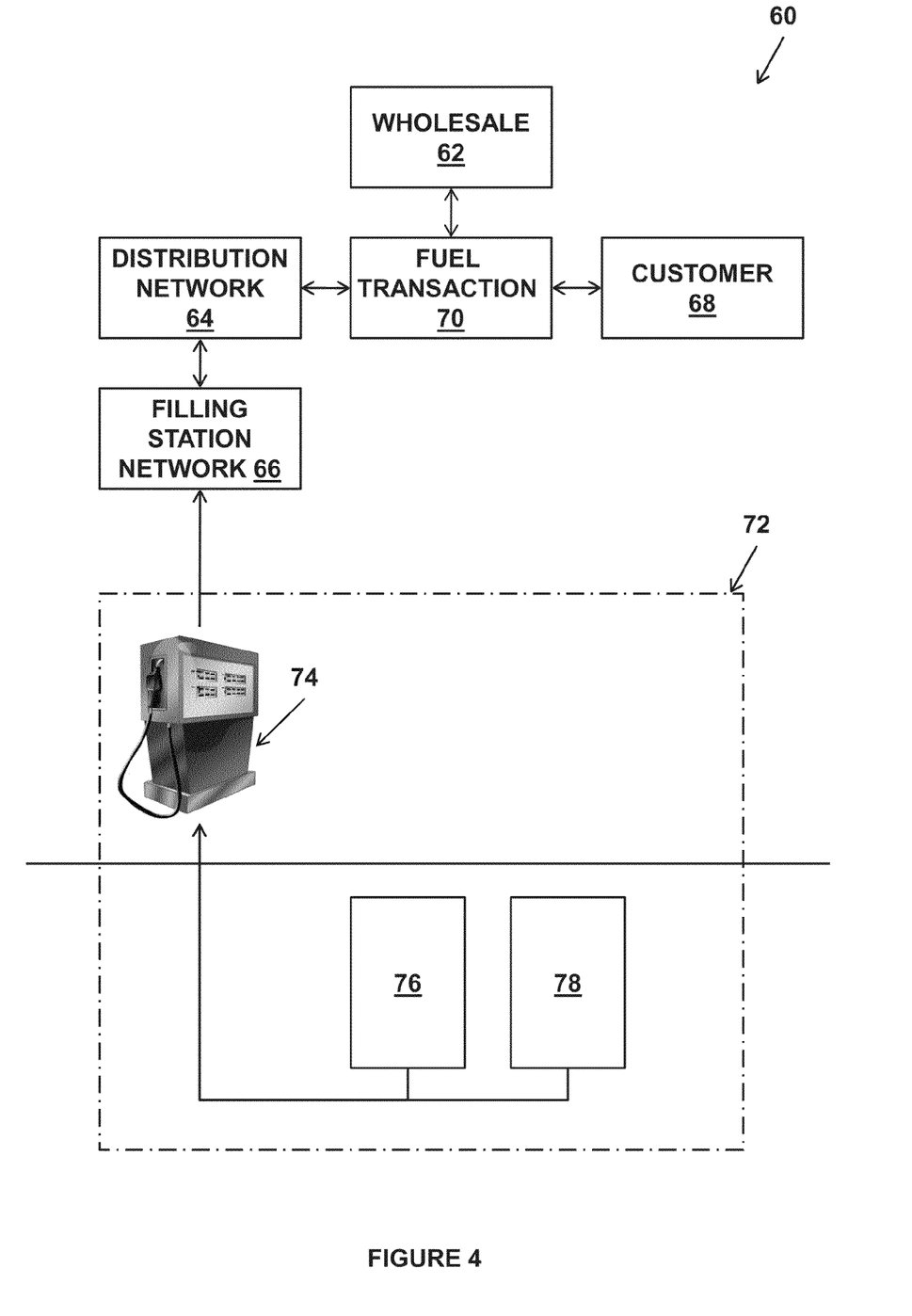
FIG. 4 is a functional diagram illustrating a system for providing fuel in accordance with an embodiment of the present invention.

It will be apparent to a skilled person that aspects of the fuel supply network 20 shown in FIG. 2 and the method 30 shown in FIG. 3 may be advantageously implemented using computer hardware, software, or any combination thereof. For example, FIG. 4 shows computer system 60 in accordance with an embodiment of the present invention and configured to perform some or all of the methods discussed above. System 60 comprises a wholesale server 62 associated with wholesaler 12, a bunkering network server 64 associated with bunkering network 14, a filling station network server 66 associated with the filling station network 16, a customer server 68 associated with the customer 18, and a fuel transaction server 70 associated with the fuel transaction service 22. Also shown in FIG. 4 is a filling station 72, comprising a filling pump 74 and a plurality of fuel bunkers 76, 78. Servers 62, 64, 66, 68 and 70 are adapted to transfer data via a communications network such as the Internet, a local area network (LAN), a wide area network (WAN), a wireless network (e.g. IEEE 802.3) or any suitable communication medium. Furthermore servers 62, 64, 66, 68 and 70 may exchange data via signals to each other directly or through one or more intermediate entities like a processor, operating system, software, or other entity.

The wholesale server 62 is responsible for determining the wholesale fuel price, $P_W$, and is configured to provide fuel transaction server 70 with data representing the wholesale fuel price $P_W$. For example, the wholesale server 62 may receive a data signal from a wholesale fuel market representing various fuel commodity spot prices, forward contracts and future contracts, and, on the basis of the data signal, calculate the wholesale fuel price $P_W$.

The fuel transaction server 70 is configured to calculate the entitlement fuel price $P_E$ on the basis of the received data representing the wholesale fuel price $P_W$. The fuel transaction server 70 is further configured to communicate the entitlement price $P_E$ to the customer via the customer server 68, and in return receive the customer order $O_E$. On the basis of the customer order $O_E$, the fuel transaction server 70 calculates the required wholesale volume of fuel, $V_W$, and sends the associated wholesale order, $O_W$, to the wholesale server 62. Where the fuel transaction server receives orders from a large number of customers, the fuel transaction server is configured to batch the orders together to produce a total volume, $V_W$, to be ordered from the wholesale server 62. As described above, the fuel is delivered to the bunkering network 14 which in turn is delivered to customers via the filling station network 16. The fuel transaction server 70 may also store data relating to the customer's account and remaining entitlement balance. When the customer 18 places and order via customer server 68, the fuel transaction server 70 is configured to update the entitlement balance on the basis of the order. In some embodiments, when the fuel transaction server 70 receives data relating to a volume of fuel, $V_C$, requested by the customer at a filling station, the fuel transaction server is configured to verify that the customer's entitlement balance is sufficient to cover the transaction volume, $V_C$, authorise the fuel transaction where appropriate, and update the entitlement balance to reflect the fuel transaction. Alternatively, if the customer's entitlement balance is insufficient, the fuel transaction server 70 is configured to decline the fuel transaction and send a message to that effect to the bunkering network server 64.

Filling station 72 comprises a filling pump 74 and a plurality of fuel bunkers 76, 78. In the illustrated embodiment, the filling station 72 is provided with fuel from a plurality of bunkering networks, and each bunkering network may own, rent, lease or otherwise have access to one or more of the bunkers 76, 78 in which fuel belonging to that network is stored. In other embodiments, the filling station 72 may be provided with fuel from a single bunkering network. Alternatively, or additionally, the fuel owned by several different bunkering networks may be stored in a single bunker and the volume of fuel remaining for each bunkering network may be accounted for locally at the filling station 72. In the embodiment shown in FIG. 4, fuel bunker 76 is associated with bunkering network 14, and bunkering server 64. Bunkering network 14 and bunkering server 64 are configured to ensure that fuel bunker 76 contains sufficient fuel to provide customer 18 with fuel when required. In some embodiments, bunkering server 74 runs modelling software, for example using historic data, to forecast fuel demand at each of the filling stations in the filling station network. In some embodiments, there may be a contractual agreement with the owner of bunker 78, whereby if the fuel stored in bunker 76 is insufficient to supply a customer, fuel from bunker 78 may be used to fulfil the obligation (and replenished at a later date).

As discussed above, the customer 18 is able to obtain a desired volume of fuel, $V_C$, from filling station 72 on production of a fuel card or token comprising the customer's account details. The filling station 72 sends to the bunkering network server 64, via the filling station network server, data representing the volume of fuel provided, $V_C$, and the customer account details (and optionally the vehicle and/or mileage details). In turn, the bunkering network 64 approves or declines the fuel transaction on the basis of the customer's entitlement volume. Alternatively or additionally, the bunkering server 64 communicates the data representing the volume of fuel provided, $V_C$, and the customer account details to the fuel transaction server 70 which approves or declines the fuel transaction on the basis of the customer's entitlement volume. Where the fuel transaction is declined by the fuel transaction server, the customer may, for example, be required to pay for the fuel at the standard retail price, or provide payment retrospectively at a higher price. Where the fuel transaction is approved, the fuel transaction server 70 is configured to receive the data and update the relevant customer account to reflect the volume of fuel provided and the remaining balance available during the entitlement time period.

Figure 5:
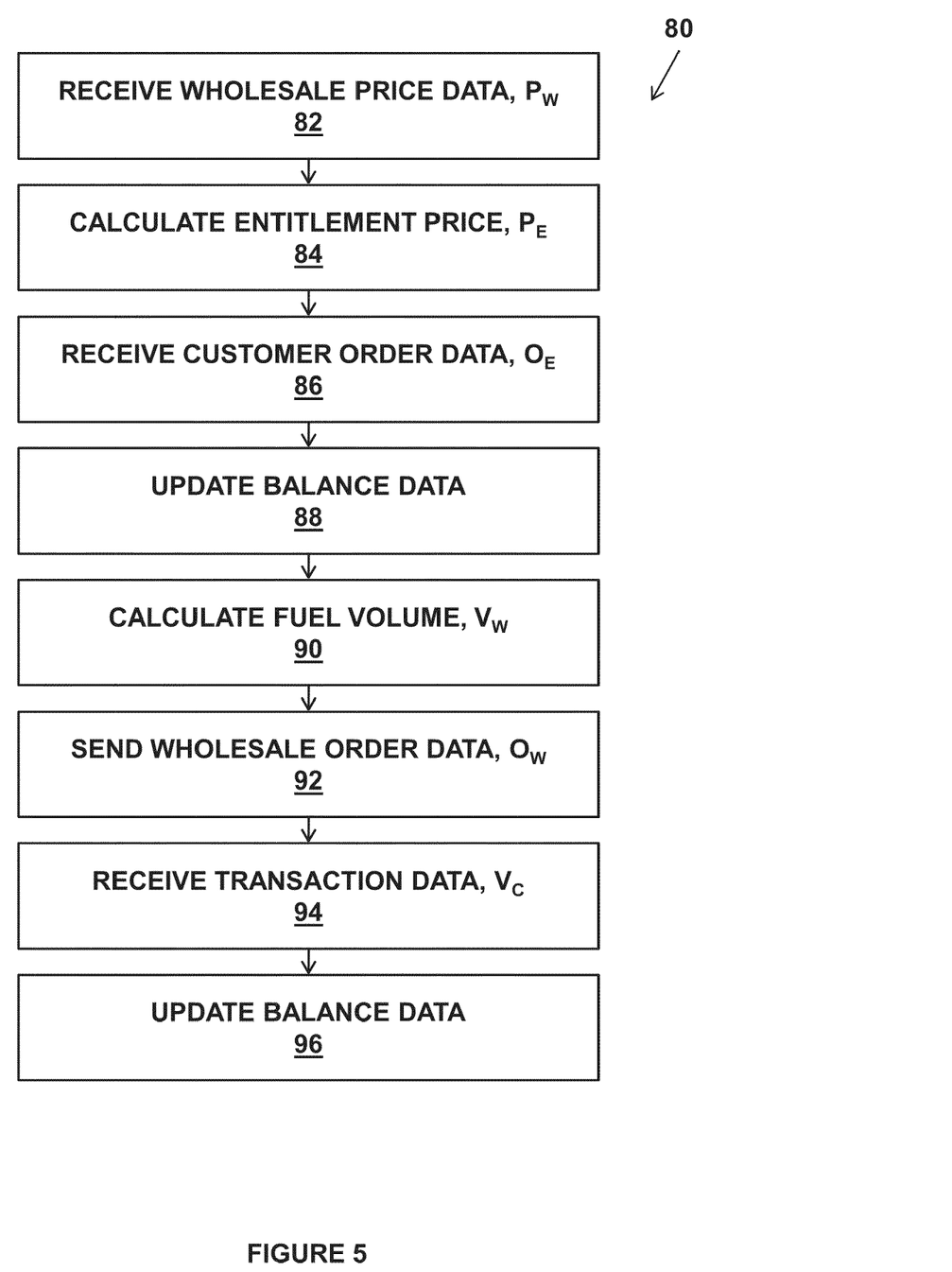
FIG. 5 is a flow diagram illustrating a computer implemented method in accordance with an embodiment of the present invention.

FIG. 5 shows a flow diagram illustrating a computer implemented method 80 performed by the fuel transaction server 70. First, the fuel transaction server 70 receives wholesale price data, $P_W$ [step 82] and calculates the entitlement price, $P_E$ [step 84]. Next, the fuel transaction server 70 receives customer 18 order data, $O_E$ [step 86] and the entitlement balance data associated with the customer 18 is updated accordingly [step 88]. Based on the customer order data, $O_E$, the fuel transaction server 70 calculates the wholesale fuel volume, $V_W$ [step 90] and sends the wholesale order data, $O_W$, to the wholesale server 62. When the customer 18 receives fuel at a filling station in filling station network 16, the corresponding transaction data is received by the fuel transaction server 70 [step 94] and the entitlement balance data associated with the customer 18 is updated accordingly 96 [step 96].

Figure 6:
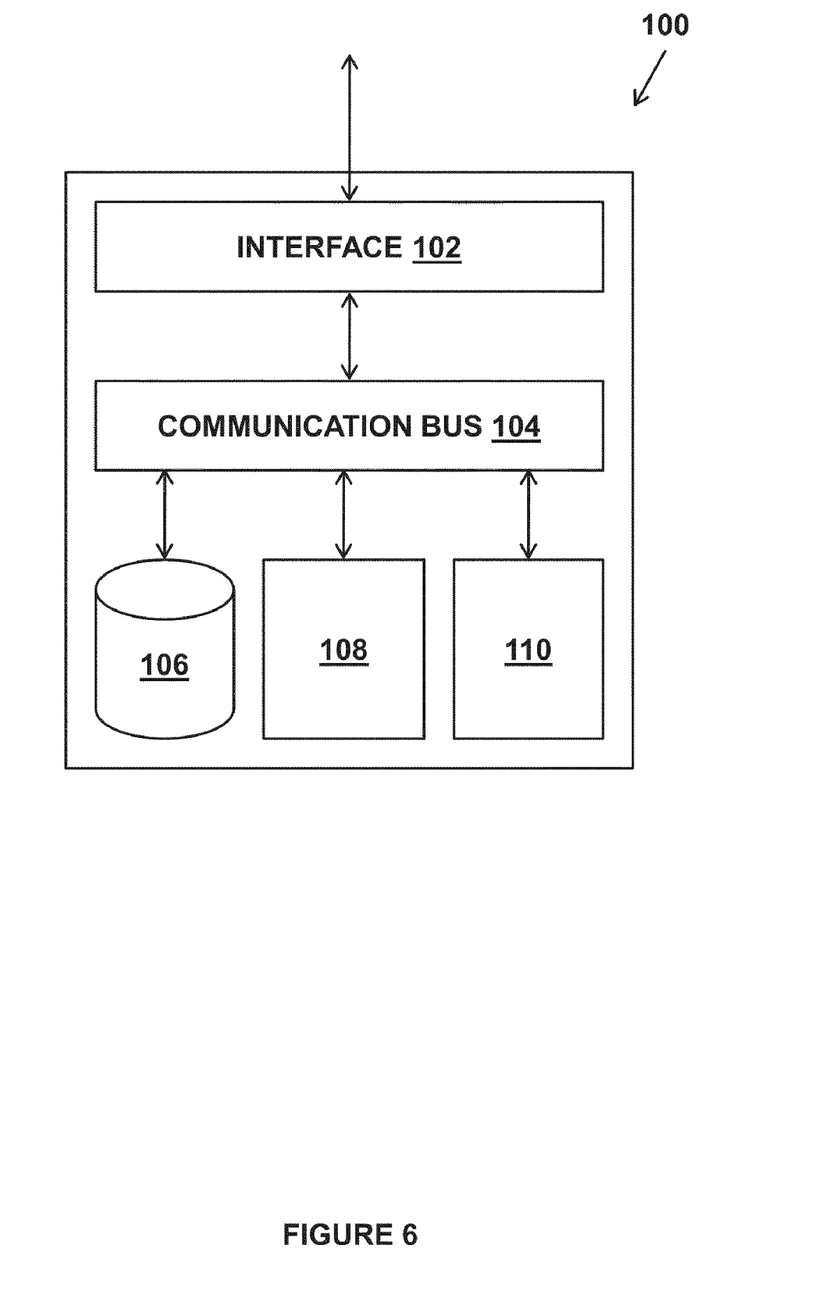
FIG. 6 is a block diagram illustrating a fuel transaction server in accordance with an embodiment of the present invention.

FIG. 6 shows a fuel transaction server 100 in accordance with an embodiment of the present invention. The transaction server comprises an interface 102, a communication bus 104, non-volatile data storage means 106, a processor 108 and system memory 110. Interface 102 provides a means for communication via a network with the other servers in the fuel supply network 20, including the wholesale server 62, the customer server 68 and the bunkering server 64. The interface is configured to communicate using any suitable protocol, including but not limited to, TCIP, HTTP or XML. Communication bus 104 provides a means by which data can be exchanged between the interface 102, the non-volatile storage means 106, the processor 108 and the system memory 110. The non-volatile memory 106 is configured to store data such as the customer account data, the entitlement balance data, or data representing the wholesale fuel price, $P_W$, and the entitlement price, $P_E$. The non-volatile storage means may additionally store computer instructions which when executed perform any of the methods described above. Processor 108 has access to the data stored on the non-volatile storage means 106 and operates in conjunction with the volatile memory 110 to execute the computer instructions.

Figure 7:
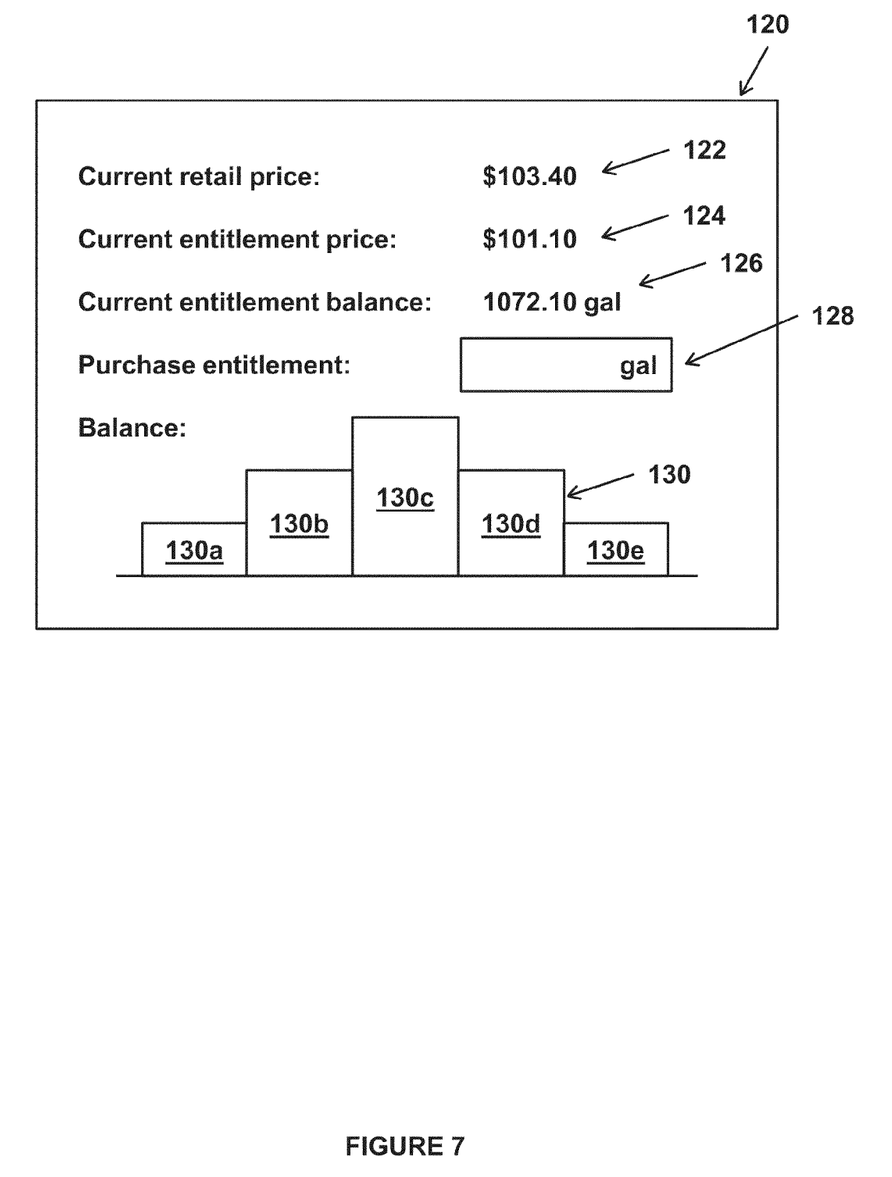
FIG. 7 is a diagram illustrating a graphical interface in accordance with an embodiment of the present invention.

FIG. 7 shows a graphical interface 120 in accordance with an embodiment of the present invention. The interface may be generated at the customer server 68 on the basis of data received from the fuel transaction server 70, 100. The graphical interface 120 shows the current retail fuel price 122 which may, for example, be an average of the retail fuel prices at each filling station in the filling station network 16. Also shown in the current entitlement price 125 and the customer's current entitlement balance 126. If the customer wishes to purchase additional entitlement, this can be done using the input box 128. In some embodiments, the customer may have purchased fuel entitlement at various different entitlement prices and with various different entitlement time periods. In order to accommodate this, the graphical interface 120 may graphically indicate the fuel entitlement balance 128 broken down by entitlement time period. For example, in FIG. 7 the entitlement balance 126 comprises entitlement volumes corresponding to five different time periods. In this case, the breakdown of entitlement balance is shown in graphic 130 where each period is illustrated separately by numerals 130a to 130e. Where the entitlement balance 126 comprises entitlement volumes corresponding to different time periods, a 'first in first out' system may be employed, whereby when a fuel transaction is completed, the entitlement volume corresponding to the earliest expiring entitlement period may be debited accordingly.

Figure 8:
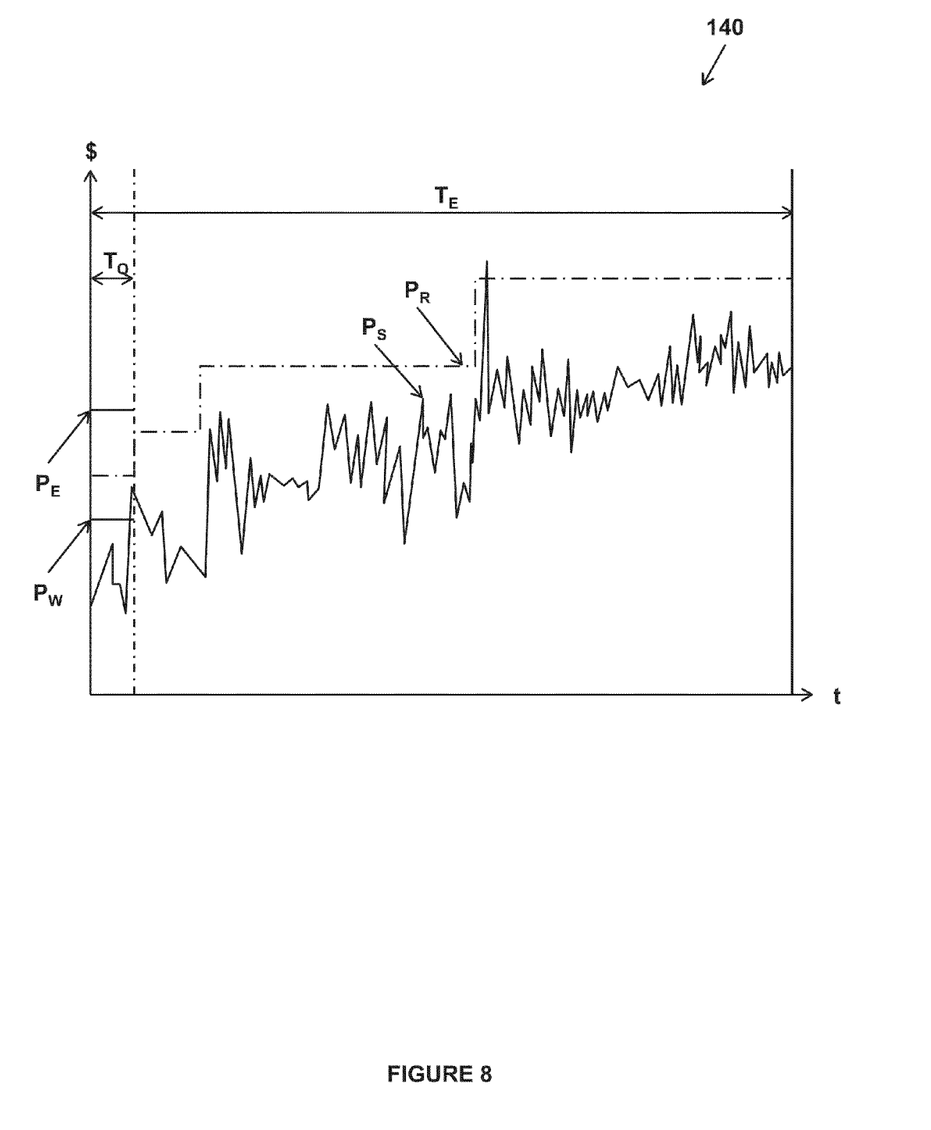
FIG. 8 is a graph illustrating the relationship between fuel spot price, wholesale price, entitlement price and retail price, in accordance with an embodiment of the present invention.

FIG. 8 illustrates the relationships between the fuel spot price, $P_S$, the wholesale fuel price, $P_W$, the entitlement price, $P_E$, and the retail price, $P_R$. The wholesale fuel price $P_W$ is calculated based on the fluctuating fuel spot price, $P_S$, and, in the illustrated example, is higher than the spot price $P_S$ during order time period $T_O$, which may for example be a 24 hour period. The entitlement price, $P_E$, includes an additional mark-up and in the illustrated embodiment is slightly higher than the retail fuel price during order time period $T_O$ and may be valid for a short time period (for example, one day or one week). However, over the course of the entitlement time period, $T_E$, which may for example be three months, during which the customer can receive fuel up to a volume equivalent to the entitlement volume, it will be seen that the retail fuel price, $P_R$, typically rises in line with the fuel spot price, $P_S$ (but may also fall depending on market conditions). Thus, by purchasing an entitlement to take delivery of a volume of fuel in advance, the customer avoids the increase in fuel prices during the entitlement time period, $T_E$.

Suitable software for implementing the various components of the example systems and methods described herein may be produced using programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server.

It will be appreciated that the above described embodiments may be modified to accommodate tax laws as appropriate for the country, region or state where the part or all of the fuel supply network 20 is implemented, without departing from the scope of the present invention. For example, tax may be added by the wholesaler 12 or the fuel transaction server, prior to presenting the entitlement cost, $P_E$, to the customer 18. Further, where aspects of network 20 are distributed across national, regional or state borders, tax may be accounted for according to standard practices.

The term 'fuel' as used herein is intended to include gasoline, diesel, liquefied petroleum gas, or indeed any fuel or energy storing medium suitable for powering a vehicle. Furthermore, it is envisaged that embodiments of the present invention may be employed advantageously to non-petroleum based fuels such as hydrogen.

The above embodiments are to be understood as illustrative examples of the invention. Further embodiments of the invention are envisaged. For example, in some embodiments, if some or all of the customer's entitlement volume, $V_E$, remains at the end of the entitlement time period, $T_E$, it may be permitted to 'carry over' a predetermined carry-over volume (for example, ten percent of the remaining entitlement balance) to a subsequent time period, thus providing additional flexibility for the customer. In a further embodiment, when a customer's entitlement balance drops below a predefined notification volume, an e-mail or SMS message may be automatically sent the customer advising them that they have reached the notification limit and inviting them to place a further order. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A computer implemented method comprising the steps of:
providing at least one server comprising at least one processor executing instructions for performing the steps of:
receiving a wholesale signal representing a wholesale fuel price;
calculating a fuel entitlement price based on the wholesale fuel price and a cost associated with distribution and storage of fuel to a plurality of filling stations, and wherein the fuel entitlement price is valid for a first order time period;
receiving within the first order time period an order signal representing a first order by a customer for a fuel entitlement volume at the fuel entitlement price, and accepting the first order, wherein the fuel entitlement volume entitles the customer to take delivery from one or more of the plurality of filling stations, within a first entitlement time period, of a volume of fuel, in the aggregate, up to the fuel entitlement volume, the first entitlement time period extending beyond the first order time period;
updating a fuel entitlement balance of the customer to reflect the first order and the first entitlement time period; and
updating the fuel entitlement balance of the customer in response to receipt of data indicating that the customer has taken delivery of a volume of fuel from a filling station.

2. The method of claim 1, further comprising receiving a filling station request signal associated with the customer taking delivery of a volume of fuel from the filling station, and authorising the request if the volume of fuel does not exceed the associated customer fuel entitlement balance and the delivery falls within the associated entitlement time period.

3. The method of claim 1, further comprising, before the end of the first entitlement time period, calculating a second fuel entitlement price, which is valid for a second order time period;
receiving within the second order time period a second order signal representing an order by the customer for a second fuel entitlement volume at the second entitlement price, and accepting the order, wherein the second entitlement entitles the customer to take delivery from one or more of the plurality of filling stations, within a second entitlement time period, of a second volume of fuel, in the aggregate, up to the second entitlement volume, the second entitlement time period extending beyond the first entitlement time period and the second order time period.

4. The method of claim 3, further comprising updating the customer fuel entitlement balance to reflect an aggregation of the first and second orders over the first and second entitlement time periods and any fuel already delivered to the customer under the first order.

5. The method of claim 1, comprising:
receiving within the first order time period plural order signals representing orders by plural customers for respective fuel entitlement volumes and calculating an aggregated fuel entitlement volume; and
purchasing sufficient fuel to satisfy the aggregated fuel entitlement volume.

6. The method of claim 5, comprising:
calculating a fuel distribution of the purchased fuel among the plurality of filling stations, based on data representing amounts of fuel delivered by each of the filling stations to the plural customers; and
distributing the purchased fuel among the plurality of filling stations according to the calculated fuel distribution.

7. The method according to claim 1, further comprising sending a signal representing a wholesale order for a wholesale volume of fuel at the wholesale fuel price, the wholesale volume being sufficient to fulfil the first order.

8. The method according to claim 1, further comprising:
receiving within the first order time period plural order signals representing orders by plural customers for respective fuel entitlement volumes and calculating an aggregated fuel entitlement volume; and
sending a signal representing a wholesale order of a wholesale volume of fuel at the wholesale price, the wholesale volume being sufficient to fulfil the aggregated fuel entitlement volume.

9. The method according to claim 1, further comprising sending a notification of the remaining customer fuel entitlement balance to the customer if the fuel entitlement balance drops below a notification volume.

10. The method according to claim 1, wherein if at the end of the first entitlement period some or all of the entitlement balance remains, further calculating a carry-over volume based on the remaining entitlement balance, and aggregating the carry-over volume with the entitlement balance associated with a subsequent entitlement period.

11. The method according to claim 1, wherein the fuel is diesel.

12. A fuel transaction server configured to perform the steps of:
receiving a wholesale signal representing a wholesale fuel price;

calculating a fuel entitlement price based on the wholesale fuel price and a cost associated with distribution and storage of fuel to a plurality of filling stations, and wherein the fuel entitlement price is valid for a first order time period;

receiving within the first order time period an order signal representing a first order by a customer for a fuel entitlement volume at the fuel entitlement price, and accepting the first order, wherein the fuel entitlement volume entitles the customer to take delivery from one or more of the plurality of filling stations, within a first entitlement time period, of a volume of fuel, in the aggregate, up to the fuel entitlement volume, the first entitlement time period extending beyond the first order time period;

updating a fuel entitlement balance of the customer to reflect the first order and the first entitlement time period; and updating the fuel entitlement balance of the customer in response to receipt of data indicating that the customer has taken delivery of a volume of fuel from a filling station.

13. A computer implemented method comprising the steps of:

providing at least one server comprising at least one processor executing instructions for performing the steps of:

receiving a wholesale signal representing a wholesale fuel price;

calculating a fuel entitlement price based on the wholesale fuel price and a cost associated with distribution and storage of fuel to a plurality of filling stations, and wherein the fuel entitlement price is valid for an order time period;

receiving customer order data representing an entitlement volume at the fuel entitlement price, wherein the entitlement volume entitles the customer to receive in aggregate up to an equivalent volume of fuel at one or more of the plurality of filling stations over an entitlement time period, the entitlement time period being longer than the order time period;

updating balance data based on the customer order data, the balance data representing a total fuel entitlement volume during the entitlement time period; and updating the balance data based on transaction data, the transaction data representing a volume of fuel received by the user at one or more of the plurality of filling stations during the entitlement time period.

14. A computer implemented method comprising the steps of:

providing at least one server comprising at least one processor executing instructions for performing the steps of:

calculating a fuel entitlement price, which is valid for a first order time period;

receiving within the first order time period an order signal representing a first order by a customer for a fuel entitlement volume at the fuel entitlement price, and accepting the first order, wherein the fuel entitlement volume entitles the customer to take delivery from one or more of a plurality of filling stations, within a first entitlement time period, of a volume of fuel, in the aggregate, up to the fuel entitlement volume, the first entitlement time period extending beyond the first order time period;

updating a fuel entitlement balance of the customer to reflect the first order and the first entitlement time period;

updating the fuel entitlement balance of the customer in response to receipt of data indicating that the customer has taken delivery of a volume of fuel from a filling station;

receiving within the first order time period plural order signals representing orders by plural customers for respective fuel entitlement volumes and calculating an aggregated fuel entitlement volume; purchasing sufficient fuel to satisfy the aggregated fuel entitlement volume;

calculating a fuel distribution of the purchased fuel among the plurality of filling stations, based on data representing amounts of fuel delivered by each of the filling stations to the plural customers; and distributing the purchased fuel among the plurality of filling stations according to the calculated fuel distribution.

* * * * *

UNITED STATES PATENT AND TRADEMARK OFFICE
CERTIFICATE OF CORRECTION

PATENT NO. : 8,185,449 B2  
APPLICATION NO. : 12/626436  
DATED : May 22, 2012  
INVENTOR(S) : Ward

Page 1 of 1

It is certified that error appears in the above-identified patent and that said Letters Patent is hereby corrected as shown below:

Column 7

Line 54, change "V" to -- $V_C$ --.

Signed and Sealed this
Eighteenth Day of September, 2012

David J. Kappos
*Director of the United States Patent and Trademark Office*